A. A. SCOTT.
SIDE CAR CHASSIS FOR MOTOR CYCLES.
APPLICATION FILED NOV. 5, 1912.
1,125,743.
Patented Jan. 19, 1915.
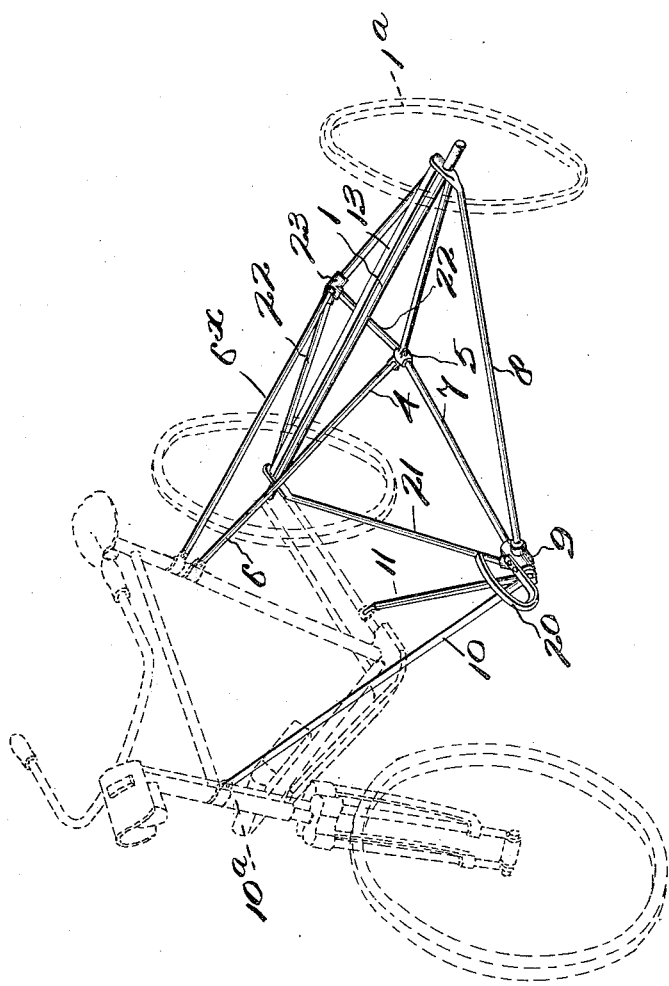

UNITED STATES PATENT OFFICE.

ALFRED ANGAS SCOTT, OF BRADFORD, ENGLAND.

SIDE-CAR CHASSIS FOR MOTOR-CYCLES.

1,125,743.  Specification of Letters Patent.  Patented Jan. 19, 1915.

Application filed November 5, 1912. Serial No. 729,580.

*To all whom it may concern:*

Be it known that I, ALFRED ANGAS SCOTT, a subject of the King of Great Britain, residing at Mornington Works, Grosvenor road, Bradford, Yorkshire, England, have invented certain new and useful Improvements in Side-Car Chassis for Motor-Cycles; and I do hereby declare the following to be a full, clear, and exact description of the invention, such as will enable others skilled in the art to which it appertains to make and use the same.

This invention relates to an improved side car chassis for motor cycles.

The object of the invention is to provide a side car, the chassis of which will be as light as possible, having regard to the necessary strength and to provide a side car in which the use of bent tubes and intermediate joints is avoided so that as far as practicable, all the members composing the chassis shall be submitted to tension and compression strains only, and not to bending strains.

The invention is illustrated in the accompanying drawings, in which:—

Figure 1 is a perspective view of the chassis, with car removed, and showing the manner of attachment to a motor cycle; Fig. 2 is a side elevation showing the chassis of a side car in accordance with the present invention, with the outer wheel removed and a portion of the body removed; Fig. 3 is an end view of Fig. 2 showing the wheel of the side car in position; and Fig. 4 is a plan view of a side car showing its connection to the frame of a motor cycle, only such parts of the motor cycle as are necessary to show the attachment of the side car to it being shown.

The present side car is constructed so as to form a triangulated structure and so that the points at which the chassis is connected to the motor cycle are angles of the triangles which go to form the triangulated structure as a whole.

From this it will be obvious that the members of the chassis will not be submitted to bending strains, but only to compression and tension strains.

In carrying out the invention, as shown in the drawings, a member 1, preferably tubular, projects out at right angles from the motor cycle 2 and is connected to the back wheel bracket 3 of the motor cycle.

Two diagonally-disposed reach members 4—4 are connected to the ends of the tubular member 1 and joined at 5 substantially beneath said tubular member. A member 7 joins the two reach members 4—4 at 5 with a junction piece 9; thus forming an apex at 5 to which is secured a connecting rod 6 arranged so that its upper end can be secured to the saddle pillar $6^a$ of the motor-cycle, or in proximity thereto. The forward end of this connecting member 7 is connected by means of a junction piece 9 to a brace member 8, which is secured to the outer end of the axle member 1. Secured to the junction piece 9 are also two attachment members, one of which (10) is adapted to be secured to the steering head $10^a$ or thereabouts of the motor cycle, and the other of which (11) carries a bracket $11^a$ adapted to be secured at any convenient point on the lower frame of the motor cycle. The wheel $1^a$ is mounted on the axle member 1. The axle member 1, which projects out from the back wheel bracket 3, is provided with two lugs 12, one toward each end, which carry between them a solid rod 13, upon which is mounted a sleeve $13^a$. This sleeve $13^a$ carries arms 14, which normally project forward somewhat and carry a cross piece 15, which in turn carries two spiral springs 16 which act as supports for the carriage body $16^a$. The sleeve $13^a$ has another arm 17, which is preferably bent so as to pass beneath the axle member 1 and to project under the carriage body $16^a$. This arm 17 is connected at its outer end to helical springs 18, which are fixed at their forward ends to a bracket or lug 19 on the forward member 7 of the chassis. The carriage body $16^a$ is mounted on the chassis as regards its front end by a suitable C spring 20, which is mounted on the junction piece 9. If desired, a second brace rod 21 may be arranged connecting the coupling 9 to the inner end of the tubular member 1, as shown.

From the foregoing description, it will be seen that the greater part of the weight of the body and passenger is carried through the sleeves $13^a$ to the solid rod 13, to the lugs 12 and so to the ends of the axle member 1 projecting out from the back wheel of the motor cycle, so that this member 1 is not submitted to any appreciable bending strains. The greater part of the driving strains is taken up through the attachment 6, being transmitted through the apex 5 of the reach member, to the connecting member 7 and through the braces 8 and 21 to the ends of the axle member 1. Such strains as are taken up by the attachment members 10 and 11 are transmitted to the coupling piece 9, and so to the ends of the axle member 1.

In addition to the afore-mentioned reinforcing elements, the axle member 1 may have secured to it a horizontally disposed truss member 22, and a strut member 24. bracing the same at the point 23 from the apex 5 of the reach members 4—4 and the connecting member 7. In this case, the point 23 may also act as the point of connection for a brace rod 6ˣ adapted to connect to the frame of the motor cycle at a point near the attachment of its adjacent brace bar 6.

I declare that what I claim is:—

1. In a side car chassis for motor cycles, an axle member, a wheel supporting said axle member at one end thereof, a forwardly projecting brace member secured substantially at the outer end of said axle member, a junction piece secured at the forward end of said brace member, downwardly inclined reach members secured substantially at each end of said axle member, a second junction piece connecting the downwardly projecting ends of said reach members, a connecting member joining said first mentioned junction piece with said second mentioned junction piece, and attachment members secured between said chassis and the frame of the motor cycle, substantially as described.

2. In a side car chassis for motor cycles, an axle member, a wheel supporting said axle member at one end thereof, forwardly projecting brace members secured substantially at each end of said axle member, a junction piece connecting the forward ends of said brace members, downwardly inclined reach members secured substantially at each end of said axle member, a second junction piece connecting the downwardly projecting ends of said reach members, a connecting member joining said first mentioned junction piece with said second mentioned junction piece, and attachment members secured between said chassis and the frame of the motor cycle, substantially as described.

3. In a side car chassis for motor cycles, an axle member extending the width of said chassis, a wheel supporting said axle member at one end thereof, forwardly projecting brace members secured substantially at each end of said axle member, a junction piece connecting the forward ends of said brace members, downwardly inclined reach members secured substantially at each end of said axle member, a second junction piece connecting the downwardly projecting ends of said reach members, a connecting member joining said first mentioned junction piece with said second mentioned junction piece, a diagonally disposed attachment member secured between said first mentioned junction piece and the steering head of the motor cycle, a horizontally disposed attachment member secured between said first mentioned junction piece and the lower frame of said motor cycle, and a diagonally disposed attachment member secured between said second mentioned junction piece and the saddle pillar of the said motor cycle, substantially as described.

4. In a side car chassis for motor cycles, an axle member, a wheel supporting said axle member at one end thereof, forwardly projecting brace members secured substantially at each end of said axle member, a junction piece connecting the forward ends of said brace members; downwardly inclined reach members secured substantially at each end of said axle member, a second junction piece joining the downwardly projecting ends of said reach members, a connecting member joining said first mentioned junction piece with said second mentioned junction piece, a horizontally inclined truss member reinforcing said reach members, a strut member secured between said truss member and said second mentioned junction piece, and attachment members secured between said first mentioned junction piece and said second mentioned junction piece and the frame of the motor cycle, substantially as described.

5. In a side car chassis for motor cycles, an axle member, a wheel supporting said axle member at one end thereof, forwardly projecting brace members secured substantially at each end of said axle member, a junction piece connecting the forward ends of said brace members; downwardly inclined reach members secured substantially at each end of said axle member, a second junction piece joining the downwardly projecting ends of said reach members, a connecting member joining said first mentioned junction piece with said second mentioned junction piece, a horizontally inclined truss member reinforcing said reach members, a strut member secured between said truss member and said second mentioned junction piece, attachment members secured between said first mentioned junction piece and said second mentioned junction piece and the frame of the motor cycle, and an attachment member secured between said truss member and the frame of said motor cycle, substantially as described.

In testimony whereof, I affix my signature, in presence of two witnesses.

ALFRED ANGAS SCOTT.

Witnesses:
  HUBERT PUMPHREY,
  CHARLES HILBERT.

Copies of this patent may be obtained for five cents each, by addressing the "Commissioner of Patents, Washington, D. C."